ARCHIE JOHN HIRST,
INVENTOR

United States Patent Office 3,433,493
Patented Mar. 18, 1969

3,433,493
VEHICLE SUSPENSION SYSTEMS
Archie John Hirst, Leicester, England, assignor to Metalstik Limited, Leicester, England, a British company
Filed Jan. 4, 1967, Ser. No. 607,253
Claims priority, application Great Britain, Jan. 5, 1966, 431/66
U.S. Cl. 280—6
Int. Cl. B60g 17/04, 21/06
9 Claims

ABSTRACT OF THE DISCLOSURE

A road vehicle suspension system has interconnected front and rear fluid springs which maintain a given vehicle body attitude regardless of differing dynamic deflections of the front and rear suspensions. Static self levelling of the vehicle body with change of load and/or load distribution on the vehicle, high stability against fore and aft pitching, and low pitching frequency are obtained, with a conventional vehicle layout, by the addition of a rear, secondary fluid spring which is maintained at an individual pressure and which is mounted in series with the rear, primary fluid spring. To achieve the desired objects a front primary spring is selected the effective area of which remains constant with deflection and a rear primary spring the effective area of which increases with deflection. One levelling valve means is associated with the primary springs and is operable in dependence upon changes in level of the front of the vehicle and a separate levelling valve means is associated with the secondary fluid spring and is operable in dependence upon changes in level of the rear of the vehicle.

Figure 1:
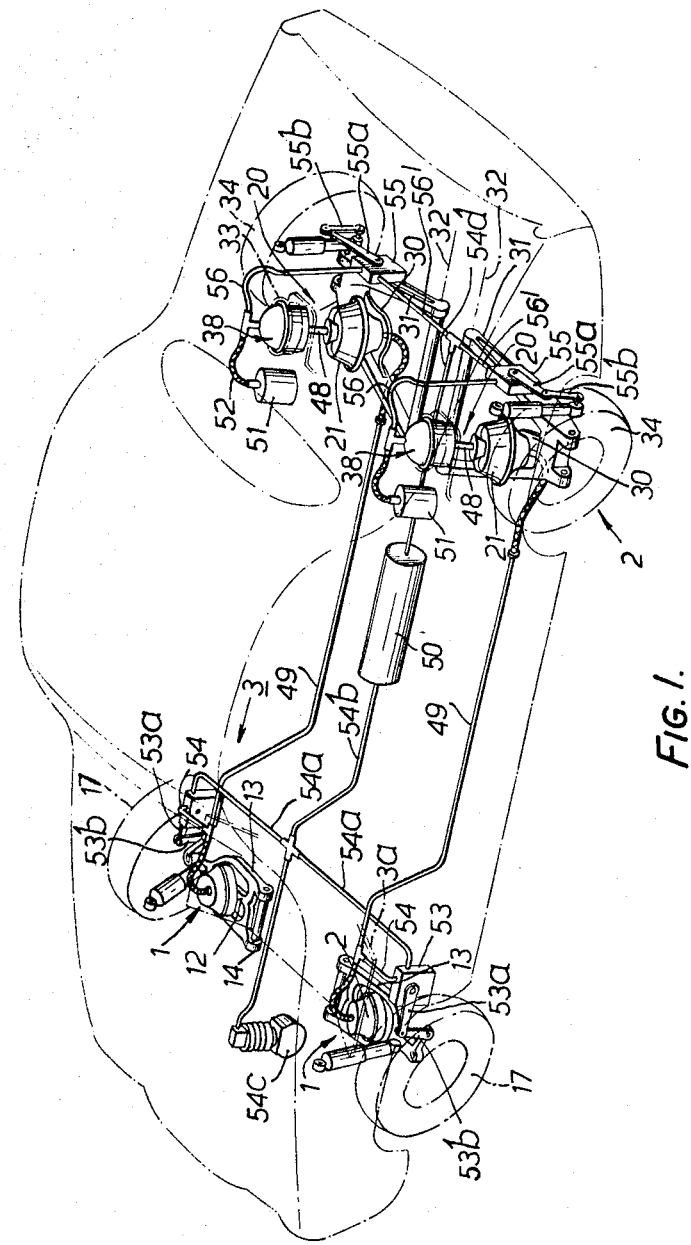

The invention concerns improvements relating to vehicle suspension systems, in particular road vehicle suspension systems of the kind comprising interconnected fluid springs of front and rear road wheel suspensions.

Such systems are known as including fluid springs, e.g. air springs, of types wherein the effective area of the spring either remains constant or varies upon deflection of the suspension. For example, a system is known wherein a constant area spring of a front suspension is interconnected with a stroke-variable area spring of a rear suspension, the variable area spring being of a type in which the effective area increases with deflection on compression, such springs constituting the sole spring means without use of additional springs.

Such a system should ideally provide for self-levelling of the vehicle body to maintain a given fore-and-aft attitude during travel over uneven road surfaces, and static self-levelling of the body as the centre of gravity of the loaded vehicle shifts, normally rearwards, with increase in static loading, together with stability against fore and aft pitching, i.e. a tendency to return to a desired attitude and suitable spring stiffness, deflection and anti-roll characteristics. An object of the invention is to provide an improved system affording such advantages. Also, it is often desirable to arrange the road wheels as near the front and rear of the vehicle as possible, i.e. at the corners of the vehicle, but this tends to increase the fore and aft pitching frequency of the body, and an object of the invention is to reduce the resistance to such pitching and thus reduce the pitching frequency.

According to the invention a vehicle suspension system comprises a primary fluid spring of a front wheel suspension, a primary fluid spring of a rear wheel suspension, means interconnecting such primary springs whereby the fluid in such springs assumes a common pressure, and a secondary fluid spring mounted so as to act in series with the primary spring of one such suspension but at an individual pressure.

Suitably the secondary fluid spring may act in series with the primary fluid spring of the rear wheel suspension.

The front primary spring may have an effective area which remains constant upon deflection, the rear primary spring has an effective area which increases with deflection on compression, and a rear secondary spring has an effective area which remains constant upon deflection or which increases with deflection on compression.

Preferably one levelling valve means is associated with the primary springs, and another levelling valve means is associated with the secondary spring.

The front and rear primary springs may be interconnected by fluid passage means with a common pressure fluid reservoir. The secondary spring may have an individual pressure fluid reservoir.

The fluid springs are suitably air springs.

Such a system will normally be operative at each side of the vehicle, in particular a four-wheeled motor car.

Figure 3:
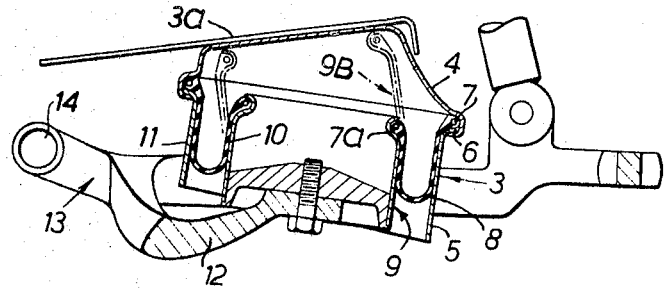
Figure 2:
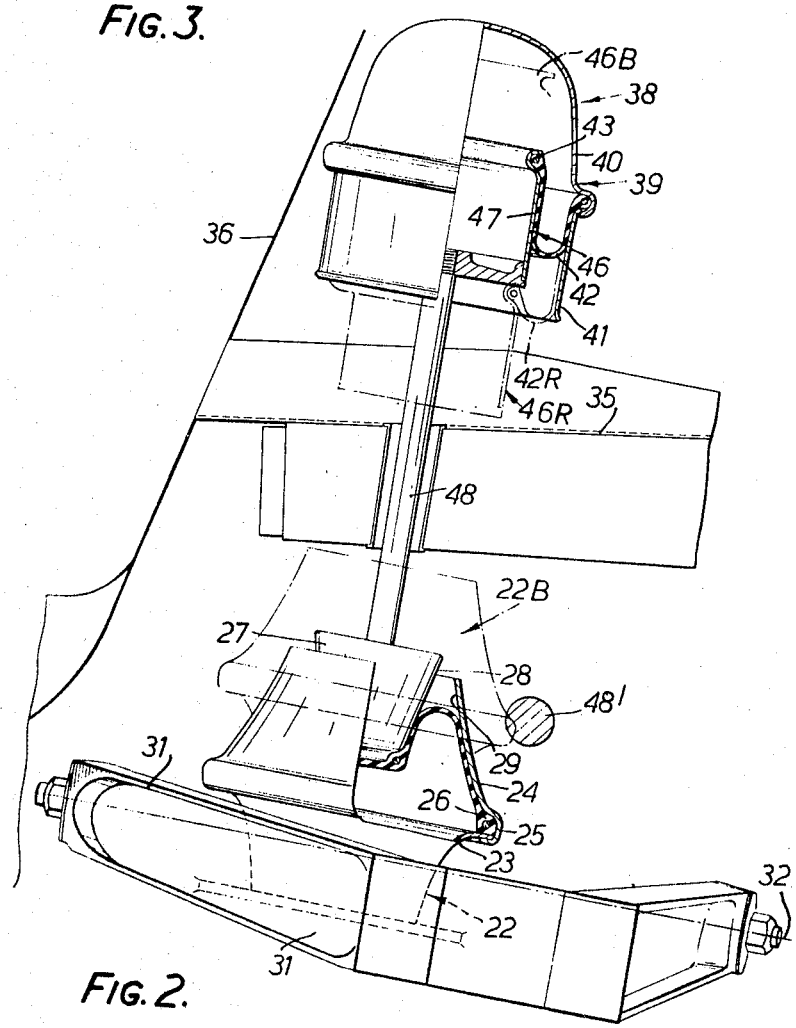

An embodiment of a suspension system in accordance with the invention is hereinafter described by way of example with reference to the accompanying drawings in which:

FIG. 1 diagrammatically illustrates a lay-out in a four-wheel road vehicle of the front and rear wheel suspensions of one side of the vehicle, FIG. 2 is an elevational view showing one of the rear wheel suspensions, in part in cross-section, looking along the axis of the wheel in the direction of arrow 2 in FIG. 1, and FIG. 3 is a cross-section showing one of the front wheel suspensions looking forwardly of the vehicle, in the direction of arrow 3 in FIG. 1.

Each front wheel suspension 1 has a primary air spring 2 of a type wherein the effective area of the spring remains constant upon deflection. The spring comprises a cylinder (see also FIG. 3) rigidly secured to a part 3a of the vehicle frame and consisting of an upper closed end part 4 and a skirt part 5 flange joined as at 6 with interposition of the outer peripheral beaded edge 7 of an annular, flexible rolling diaphragm 8. A piston 9 operates within the cylinder the cylinder being attached, at its crown, to the inner peripheral beaded edge 7a of the diaphragm, the piston and cylinder presenting parallel walls, 10, 11 respectively. The piston is mounted on a support 12 presented by a lower wishbone 13 pivotally mounted as at 14 on the vehicle frame. The spring is disposed below an upper wishbone (not shown) also pivotally mounted on the frame. The outer ends of the wishbones pivotally carry, in very well known fashion, the kingpin standard of the respective road wheel mounting assembly, for the road wheel 17 supported from the frame by the suspension.

Each rear wheel suspension 20 has a primary air spring 21 of a type wherein the effective area of the spring increases with deflection on compression. The spring comprises a cylinder 22 (see FIG. 2) consisting of a lower closed end part 23 and a skirt part 24 flange joined as at 25 with interposition as above the outer beaded edge of a flexible rolling diaphragm 26. A piston 27 operates within the cylinder against the centre of the diaphragm, the piston and skirt presenting walls 28, 29 respectively of opposed generally conical form to provide the required stroke-variable effective area. The actual form depends on the chosen deflection characteristic as later explained. The cylinder 22 is mounted on a support 30 presented by a lower wishbone 31 pivotally mounted as indicated at 32 on the vehicle frame. An upper wishbone (not shown) is likewise pivoted to the frame, the wishbones pivotally carrying the respective road wheel mounting assembly for the rear road wheel 34 suspended from the vehicle frame by the suspension.

A boot floor is indicated at 35 in FIG. 2 and a boot wall at 36.

A secondary air spring 38 is mounted so as to act in series with such primary spring of the rear suspension, and as shown is of the type wherein the effective area of the spring remains constant with deflection. It might however be of the type wherein the effective area increases with compression. The spring 38 comprises a cylinder 39 rigidly secured to a part 33 of the vehicle frame, the cylinder consisting of an upper end part 40 and skirt 41 flange joined with interposition as above of the outer beaded edge of a flexible rolling diaphragm 42. A radially inner beaded edge 43 of the diaphragm is fixed to the crown of a piston 46 having a cylindrical wall 47 in spaced parallel relation to the cylinder skirt 41. The piston 46 is mounted at the upper end of an intermediate member or column 48 which carries at its lower end the piston 27 of the primary spring 21 and is offset from a transverse vertical plane containing the respective half shafts indicated at 48' in FIG. 2.

The primary front and rear air springs are interconnected by a fluid passage means such as pipeline 49, and by other connections to be described, with a common pressure air reservoir 50, so that the air in such springs assumes a common pressure, disregarding transient disturbances due to instantaneous deflection effects. Each secondary rear spring has an extra volume tank 51 and a pipeline connection 52 thereto. The suspensions are drawn in full lines in the static mean position, parts are indicated in extreme bump and rebound positions at 9B, 9R, 22B, 42R, 46R, 46B respectively to indicate the travel of the suspensions.

A separate front levelling valve means indicated at 53 is mounted on the vehicle frame and is connected to each front primary spring via a pipeline 54 branching from the pipeline 49 communicating with the spring for adjusting the level of the front of the vehicle body. Each levelling valve 53 has a further pipeline connection 54a with a pipeline 54b connecting an air compressor 54c coupled to be driven by the engine of the vehicle with the compressed air reservoir 50. A separate rear levelling valve means indicated at 55 is mounted on the vehicle frame and is connected to each rear secondary spring 38 via pipeline 56 for adjusting the level of the rear of the vehicle body. The levelling valves 55 are connected by pipelines 56' and pipeline 54d with the compressed air reservoir 50 to supply air under pressure to the respective springs 38 and the levelling valves also have air vents to the atmosphere to vent air from the springs 38 dependent upon the level and attitude of the vehicle body to the road so as to maintain the body at substanially the same level and attitude under varying static loading conditions as distinct from dynamic substantially instantaneous loading conditions caused by unevenness of road surface and compensated for by the interconnection of the front and rear primary springs 2 and 21. The levelling valves 53, 55 are suitably made responsive to variation of such static loading conditions lasting for more than a minimum predetermined delay period, e.g. 7 seconds and the construction of the valves to achieve this delayed response may take any known or convenient form the valves being constructed and arranged as described in British patent specification 875,692 for example. The levelling valves are operated automatically according to the attitude of the respective suspension relative to the vehicle frame. Each valve has a pivoted operating arm 53a or 55a which is movable angularly to adjust the levelling valve. The arms 53a, 55a are connected to the adjacent lower wishbone 13 or 31 by a line 53b or 55b so that rising and falling pivoting movements of the wishbone are communicated to the arm 53a or 55a to adjust the levelling valve.

For example, if extra load is added at the rear of the vehicle, e.g. by passengers or luggage, the rear of the body sinks relative to the road and the rear levelling valves 55 are automatically operated to increase the pressure in the rear secondary springs 38 to restore the rear of the body to the desired height.

When the rear of the vehicle sinks due to the extra loading the wishbones 31 are pivoted upwardly relative to the body causing the arms 55a to pivot upwardly. After the appropriate delay, e.g. 7 seconds, air under pressure is admitted from the reservoir 50, the pipeline 54d, the pipelines 56', the levelling valves 55 and the pipelines 56 into the secondary springs 38. As the level of the vehicle is restored and the rear of the body of the vehicle raised to its previous height above the ground, the wishbones 31 are pivoted downwardly relative to the body, causing the arms 55a to pivot downwardly to their initial setting as illustrated, so cutting off the supply of compressed air to the springs 38.

When load is removed for example from the rear of the vehicle, the rear of the body tends to rise relative to the road and after the appropriate delay the valves 55, actuated through the links 55b and the operating arms 55a allow air to escape from the springs 38, the pipelines 56 and the air vents in the valves 55 to atmosphere so that the rear of the vehicle is lowered until the arms 55a are restored once again to their angular setting as illustrated.

The front levelling valves 53 will similarly operate on the primary springs 2 and 21 to maintain the height of the body in particular at the front at a desired amount generally so that the body is level with respect to the road. These valves affect the level both front and rear, but at the rear to a lesser degree due to the higher loading and the decreasing area effect of the rear primary springs 21. Thus both sets of levelling valves 53, 55 act appropriately to maintain a desired height and attitude of the vehicle body with respect of the road regardless of changes of load of the vehicle or the distribution of the load of the vehicle.

The levelling valves will also automatically compensate for any air losses in the systems.

The delayed action of the levelling valves may, if desired, be over-ridden by a pendulum or other inertia control means so that the valves may also function under varying driving loading conditions, such as due to acceleration, braking or cornering.

As a typical example, the driver-only or tare loading may be 1000 lbs. per front wheel 17 and 850 lbs. per rear wheel 34, and the full loading with passengers and luggage, 1,100 lbs. per front wheel 17, and 1,275 lbs. per rear wheel 34. The primary spring working air pressure in the springs 2 and 21 may be 8 atmosphere guage at 1,000 lbs. load. The effective area of the primary rear springs 21 may increase with deflection according to an exponential law, or alternatively, a logarithmic or linear or more closely linear law could be adopted. The working air pressure of the secondary rear springs 38 may be 5 atmospheres at 850 lbs. wheel load.

Front and rear dynamic deflection for load applied at both front and rear together is kept relatively low, and roll can be reduced without need of an anti-roll bar connecting the front suspension units.

The relation between dynamic deflections at front and rear for opposite wheel movements, e.g. one wheel encountering bump, and the other wheel moving in opposite direction to maintain a level attitude of the body, is controlled mainly by the variable area characteristics of the rear primary springs 21. For such opposite wheel movements, the spring reaction is suitably lower at the front, to give an elastic centre for pitching well behind the centre of gravity of the vehicle as is generally desirable.

As mentioned above, the area of the rear primary springs 21 may increase with deflection according to any suitable law. In any case, upon increasing the loading on the rear springing from said 850 lbs. to 1,275 lbs., the intermediate member 48 of the rear spring assembly would be deflected downwards until the area of such rear primary spring has increased by say 50% for example. The linear characteristic would provide a relatively lower pitching resistance at full static load, as compared with an exponential or logarithmic characteristic, using which, the pitching resistance at full static load more closely resembles that at tare loading, which result may be more suitable.

The mean effective area of the rear primary springs 21 is greater than that of the front in proportion approximately to the mean static rear and front wheel loads if the spring ratio is the same.

In the case of dynamic compression of the springing upon vertical body bounce, i.e. movement of both front and rear suspensions together, at full loading, the rear primary springs 21 may have substantially no deflection, the deflection being provided by the secondary rear springs 38, or the rear primary springs may have some deflection.

The stiffness of the springing may by way of modification be lessened by increasing the air volumes, and making the rear primary springs of more closely linear characteristic, although still having a greater relative change of effective area at the fully laden than at the unladen position for a given small deflection. The front and rear springing are both made softer due to such greater volume of air. The difference in corresponding deflections as between the tare and fully laden conditions is lessened, partly as a result of said characteristic modification, and partly as a result of the smaller relative change in volume as between tare and laden conditions. There is less reduction in pitching stiffness with increasing load, and the elastic centre of pitching tends to shift more rearwardly as is desirable for a fully laden vehicle. Dynamic deflection of the front springs 2, with the rear suspension steady, tends to be greater, and may be modified by the use of an anti-roll bar, but this does not apply to vertical bounce (both front and rear deflected in same direction), and pitching (front and rear deflected in opposite directions). The anti-roll bar may be eliminated with the lesser air volumes, as mentioned above.

The specific properties of a suspension system in accordance with the invention can be varied within wide limits according to the requirements for good riding on any particular vehicle, e.g. by changes in air volumes and rear primary spring chaacteristics as mentioned.

As described above, the spring components are mounted rigidly on the respective wishbones and body structure. However, such components may be pivotally mounted so that the piston and cylinder of each spring deflect purely axially relative to one another and thus the rolling diaphragm changes its configuration symmetrically relative to the axis of deflection. This reduces the maximum range of movement and change of configuration of the diaphragm so as to give better fatigue life. The components may be guided to achieve such axial deflection, and the guide may for example be formed by a shock absorber.

We claim:
1. A vehicle suspension system comprising:
   a primary fluid spring of a front wheel suspension;
   a primary fluid spring of a rear wheel suspension;
   means interconnecting said primary springs such that the fluid in said springs assumes a common pressure; and
   a secondary fluid spring connected in series with one of said primary springs but at an individual pressure, said one of said primary springs having an effective area which increases with deflection on compression thereof.
2. A vehicle suspension system as claimed in claim 1 wherein the secondary fluid spring is connected in series with the primary fluid spring of the rear wheel suspension.
3. A vehicle suspension system as claimed in claim 2 wherein the front primary spring has an effective area which remains constant upon deflection, and a rear secondary spring has an effective area which remains constant upon deflection.
4. A vehicle suspension system as claimed in claim 1 wherein the front and rear primary springs are interconnected by fluid passage means with a common pressure fluid reservoir.
5. A vehicle wheel suspension system as claimed in claim 1 wherein the secondary spring has an individual pressure fluid reservoir.
6. A vehicle wheel suspension system as claimed in claim 1 wherein the fluid springs are air springs.
7. A vehicle suspension system as claimed in claim 1 comprising one levelling valve means associated with the primary springs, and another levelling valve means associated with the secondary spring.
8. A vehicle suspension system as claimed in claim 7 wherein said levelling valves are responsive to variation of static loading conditions lasting for more than a predetermined minimum delay period.
9. A vehicle suspension system as claimed in claim 8 further comprising control means to over-ride the delay action of the levelling valves so that the valves may also function under varying driving loading conditions.

References Cited

UNITED STATES PATENTS

| 2,978,254 | 4/1961 | Bundorf | 280—104 |
| 2,973,968 | 3/1961 | Behles | 280—104 |
| 3,264,008 | 8/1966 | Allinquant | 280—614 |

PHILIP GOODMAN, Primary Examiner.

U.S. Cl. X.R.

267—11; 280—104, 124